Patented May 18, 1937

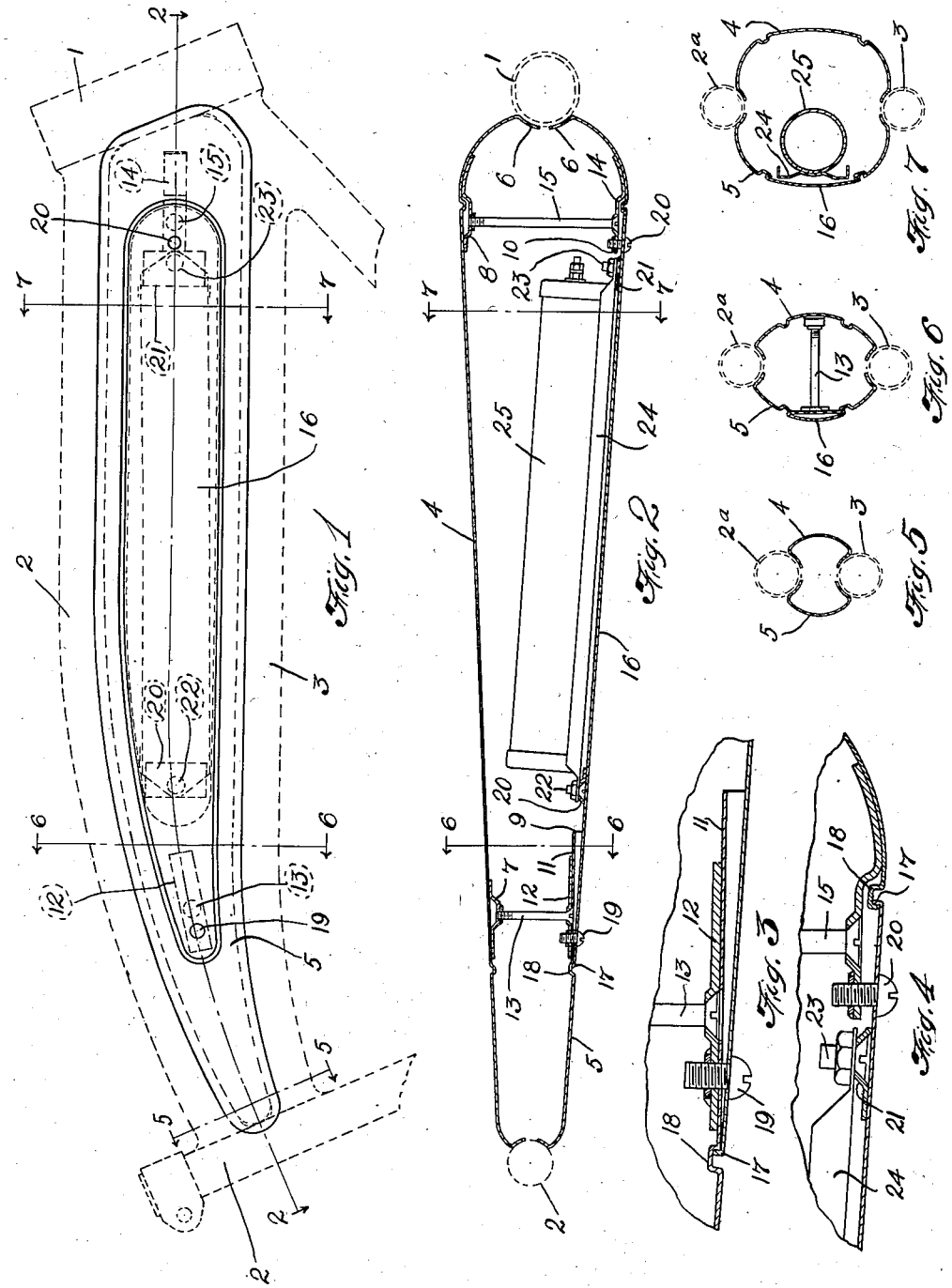

2,080,677

UNITED STATES PATENT OFFICE 2,080,677

BICYCLE

Harold R. Uber, Lakewood, Ohio, assignor to The Cleveland Welding Company, Cleveland, Ohio, a corporation of Ohio Application April 28, 1936, Serial No. 76,798

5 Claims. (Cl. 224—35)

This invention relates as indicated to bicycles and more particularly to the provision of a novel means for providing a closure for a portion of a conventional frame which closure may have the function, among others, of providing an accessory compartment.

Accessory compartments commonly called "tanks" for use in conjunction with bicycle frames have usually consisted of a sheet metal container adapted to be suspended by means of suitable clamps from an element or bar of the bicycle frame. These prior art structures have generally been of such a nature as not to harmonize with the general outline of the bicycle frame; have required supporting means in the nature of clamps which offered objectionable obstructions and projections on the frame resulting in the tearing of clothes, etc.; and have been considerably more expensive and more difficult to manufacture than the device comprising my invention.

It is accordingly a principal object of my invention to provide a device which may be attached to a conventional bicycle frame without the employment of any projecting lugs or clamps.

It is a further object of my invention to provide a device of the character described which utilizes to its fullest extent the space within the bicycle frame for the accommodation of accessories and the like, such device made in accordance with the principles of my invention being characterized by low cost of manufacture and facility of installation.

Other objects of my invention will appear as the description proceeds.

To the accomplishment of the foregoing and related ends, said invention, then, consists of the means hereinafter fully described and particularly pointed out in the claims; the annexed drawing and the following description setting forth in detail certain means and one mode illustrating, however, but one of the various ways in which the principle of the invention may be used.

In said annexed drawing:

Fig. 1 is a fragmentary side view of a conventional bicycle frame having associated therewith a device constructed in accordance with the principles of my invention; Fig. 2 is a transverse sectional view of the assembly illustrated in Fig. 1 taken on a plane substantially indicated by the line 2—2; Fig. 3 is a fragmentary sectional view drawn to an enlarged scale of a portion of the structure illustrated in Fig. 2, more particularly, the securing means shown in the lefthand portion of said last-named figure; Fig. 4 is a fragmentary sectional view drawn to an enlarged scale of a portion of the securing means shown at the righthand side of Fig. 2; and Figs. 5, 6 and 7, are respectively transverse sectional views of the assembly illustrated in Figs. 1 and 2 taken on the planes respectively indicated by the lines 5—5, 6—6 and 7—7.

Referring now more specifically to the drawing and more especially to Figs. 1 and 2, the bicycle frame partially shown in these figures and with which the device comprising my invention is shown associated consists of a forward post generally indicated at 1, which may be conveniently referred to as the steering column post, since within such post the column of the front fork of the bicycle which, at its upper end carries the handle bars, is mounted.

A rearward post, generally indicated at 2, may be conveniently referred to as the seat post of the frame since into such frame element extends the post upon which is supported the seat of the bicycle.

Extending between the posts 1 and 2 are vertically spaced frame bars generally indicated at 2 and 3, these bars, as well as the posts and the associated elements of the bicycle frame being formed of any suitable material such as steel tubing or the like.

Referring now more specifically to the device comprising my invention, it will be noted that the same consists generally of two sheet metal members generally indicated at 4 and 5, the former for convenience being referred to as the rear member and the latter being for convenience referred to as the front member.

The members 4 and 5 are provided with marginal flanges such as 6 for snug engagement with the frame elements so that when the two members 4 and 5 are placed in juxtaposition on opposite sides of the frame, they will form therewith a closed compartment with the marginal flanges 6 of the members 4 and 5 in engagement with the adjacent elements of the frame.

Secured to the inner face of the rear member 4 are lugs 7 and 8 secured by any suitable means such as spot welding and provided with central portions extending away from the wall of the member 4, which central portions are provided with screw-threaded openings.

The forward member 5 is provided with a central opening which extends between the lines indicated at 9 and 10. The area of the member 5 immediately to the left of the opening, i. e., the line 9, is deformed inwardly as at 11 and to such deformed area there is secured a reinforcing plate 12 through which plate, as well as the deformed portion 11 there extends an opening for the insertion of a screw 13, the threaded terminal of which extends into the threaded opening of the bracket 7 on the rear member 4.

Secured to the inner face of the member 5 to the right of the opening, i. e., to the right of the line 10, there is secured by any suitable means such as spot welding a bracket 14 provided with an opening through which extends a screw 15, the threaded terminal of which extends into the threaded opening in the bracket 8 on the member 4.

The opening thus formed in the front face of the member 5 is normally closed by means of a removable plate 16, the outline of which is formed to correspond to the configuration of the opening and with the marginal portions provided with a rearwardly extending flange 17 as most clearly illustrated in Figs. 3 and 4. The member 5 about the previously described opening is provided with a channel-shaped recess 18 for the reception of the flange 17.

The reinforcing strip 12 and the bracket 14 are respectively provided with threaded apertures and the closure plate 16 is provided with lined openings through which extend the screws 19 and 20 by which the cover plate 16 is removably secured to the forward member 5.

The inner face with the removable cover plate 16 is provided with brackets 20 and 21 carrying screws 22 and 23 by means of which a plate 24 is removably secured to the inner face of the cover plate 16. The plate 24 may have secured thereto by any suitable means such as spot welding a tubular case 26 which may be formed to accommodate dry cell batteries for the head lamp of the bicycle.

The device comprising my invention is assembled and secured to the bicycle frame in the following manner:—

The rear member 4 is first placed into engagement with the rear side of the frame with the marginal flanges 6 thereof in proper register with the adjacent portions of the frame. The forward member 5 with the cover plate 16 removed is then similarly placed on the forward side of the frame and the screws 13 and 15 inserted in the manner shown in Fig. 2 and tightened to force the members 4 and 5 together and accordingly their marginal portions into securing engagement with the frame members. After the members 4 and 5 have been thus secured to the frame, the cover plate 16 is attached by means of the screws 19.

It will be observed that a device constructed in accordance with the principles of my invention does not rely upon any exterior clamps in securing the same to the bicycle frame and further, that the absence of such exterior securing clamps not only precludes the possible marring by the same of the painted surface of the frame members but also results in a structure more pleasing to the eye than that which relies upon exterior clamping means. The provision of the removable cover plate also makes it possible to hide from view the securing screws 13 and 15 which are employed for the purpose of fastening the device to the frame so that the only screws appearing on the exterior of the assembly are the small screws 19 and 20 employed to secure the cover plate.

The mounting of the battery box on the inner face of the removable plate 16 further facilitates the replacement of the batteries therein when necessary and likewise so supports the battery container that there is no possibility of the same moving about in the compartment defined between the members 4 and 5.

The manner in which the securing screws for the cover plate 16 are related to the main securing screws 13 and 15 is such that when the former are tightened in applying the cover plate 16, they have a tendency to increase the tension on the main securing screws 13 and 15 thus insuring that the assembly is at all times rigidly secured to the frame.

Other modes of applying the principle of my invention may be employed instead of the one explained, change being made as regards the means and the steps herein disclosed, provided those stated by any of the following claims or their equivalent be employed.

I, therefore, particularly point out and distinctly claim as my invention:—

1. A device for use in combination with a bicycle frame having spaced frame bars, comprising two sheet metal members respectively provided with marginal flanges for engagement with said frame bars on opposite sides of said frame, means extending between the juxtaposed faces of said members drawing the same together, said last named means being the only means securing said members to said frame.

2. A device for use in combination with a bicycle frame having frame bars so arranged as to provide a space laterally completely enclosed thereby, the combination of a pair of deformed sheet metal members respectively adapted to engage said bars on opposite sides of said space and means for drawing said members toward each other and into engagement with said bars to completely enclose said space.

3. A device for use in combination with a bicycle frame having spaced frame bars, comprising two members respectively adapted to lie on opposite sides of said frame with their portions in engagement with said spaced bars and thus define a closed compartment, means extending between the juxtaposed faces of said members drawing the same together and into engagement with said frame, one of said members provided with an opening, and a plate removably secured to said last-named member for closing said opening.

4. A device for use in combination with a bicycle frame having spaced frame bars, comprising two members respectively adapted to lie on opposite sides of said frame with their portions in engagement with said spaced bars and thus define a closed compartment, means extending between the juxtaposed faces of said members drawing the same together and into engagement with said frame, one of said members provided with an opening, a plate removably secured to said last-named member for closing said opening, and an accessory case secured to the inner face of said plate.

5. In combination, a bicycle frame including a steering column post and a seat post, vertically spaced bars extending between said posts, two sheet metal members respectively provided with marginal areas for engagement on opposite sides of said frame with said posts and bars, and means extending between the juxtaposed faces of said members drawing said members together and into securing engagement with said posts and bars.

HAROLD R. UBER.